F. T. CONLEY.
ATTACHMENT FOR TEA AND COFFEE POTS.
APPLICATION FILED JULY 9, 1917.
1,274,142.
Patented July 30, 1918.
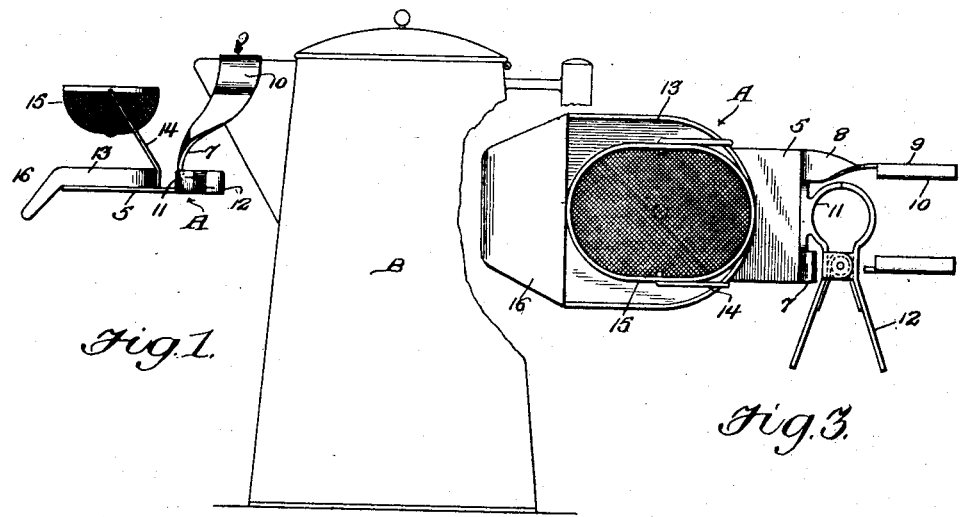
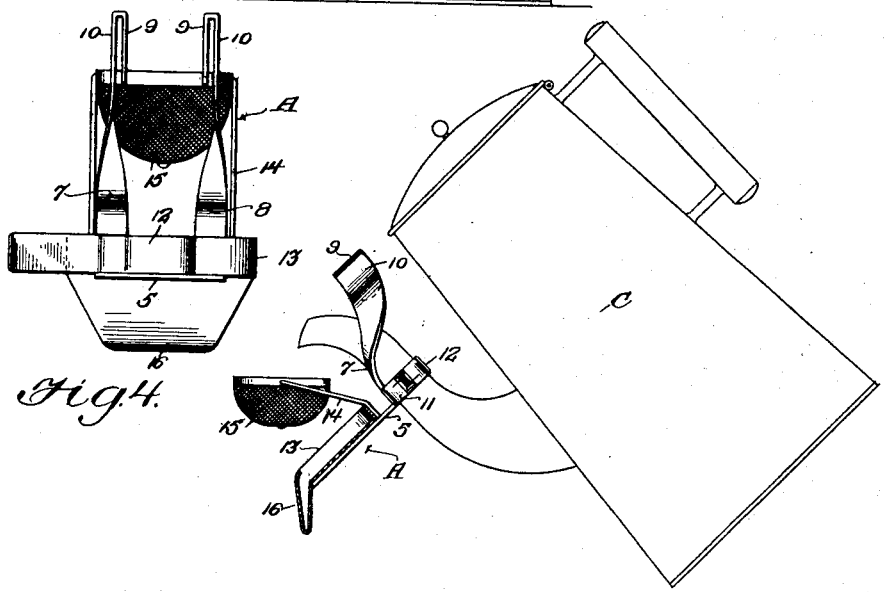
WITNESSES
INVENTOR
F. T. Conley,
BY Victor J. Evans
ATTORNEY

000# UNITED STATES PATENT OFFICE.

FREDERICK T. CONLEY, OF BOSTON, MASSACHUSETTS.

ATTACHMENT FOR TEA AND COFFEE POTS.

1,274,142.

Specification of Letters Patent. Patented July 30, 1918.

Application filed July 9, 1917. Serial No. 179,489.

*To all whom it may concern:*

Be it known that I, FREDERICK T. CONLEY, a citizen of the United States, residing at Jamaica Plain, Boston, in the county of Suffolk and State of Massachusetts, have invented new and useful Improvements in Attachments for Tea and Coffee Pots, of which the following is a specification.

This invention relates to an attachment for tea and coffee pots which when applied thereto may be employed to strain the contents of the pot, while being poured therefrom.

The primary object of the invention is to provide an attachment of this character which may not only be attached to the different types of spouts upon vessels of this character now in common use but is so constructed that when a swingingly mounted reticulated member through which the contents of the pot is poured is not in use, the drippings from this member may be caught and retained within a receptacle with which the attachment is provided.

Another object of the invention is to provide the attachment with a receptacle for catching and retaining drippings from the reticulated member when the reticulated member is not in use, with the receptacle so constructed as to prevent the contents of the receptacle from escaping therefrom, while the contents of the pot is being poured through the reticulated member.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications within the scope of the claims may be resorted to when desired.

In the drawing:

Figure 1 is a view in side elevation of the attachment, and showing the same applied to the spout of a coffee pot.

Fig. 2 is a view in side elevation, partly in section, showing the attachment applied to the spout of a tea pot which is in position to permit the contents of the pot to be poured from the spout.

Fig. 3 is a top plan view of the attachment.

Fig. 4 is an end view thereof.

Like characters of reference denote corresponding parts throughout the several views in the drawing.

Referring now to the drawing in detail, the letter A designates an attachment for tea and coffee pots constructed in accordance with the invention wherein a plate of resilient material 5 is slotted longitudinally for a portion of its length to provide the plate with a pair of upstanding and spaced hooks 7 and 8, the bills 9 of which are adapted to extend within the spout of a vessel designated in Fig. 1 in the drawing by the letter B when the spout has been passed between the shanks 10 of the hooks which are recessed and offset as shown.

The hook 8 has its shank provided with an extension 11 to which is pivotally connected a spring actuated bar 12 coacting with the extension and plate 5 in providing the attachment with a clamp whereby the attachment may be connected with the spout of a vessel indicated by the letter C in Fig. 2 in the drawing.

An open topped receptacle 13 is mounted upon the plate 5 and serves as a support for an inclined yoke 14 between the arms of which is mounted to swing a weighted and reticulated basket 15 through which the contents of the receptacle to which the attachment is applied is poured. Said receptacle 13 which serves to catch the drippings from the basket 15 when the basket is not in use is provided at one end with a pocket 16 which extends below the bottom of the receptacle and prevents the drippings from the basket from being spilled from the receptacle 13 when the basket 15 is in use.

When it is desired to apply the attachment to a coffee pot having a spout shaped as shown in Fig. 1 in the drawing, the spout is passed between the shanks of the hooks and bills of the hooks engaged with the spout as shown, after which, the contents of the pot may be poured through the basket 15 and the drippings from the basket when not in use caught and held by the receptacle 13.

When it is desired to use the attachment in connection with a tea pot having a spout shaped as shown in Fig. 2 in the drawing, the spout is arranged within the recesses in the shanks of the hooks and engaged with the plate 5 by the bar 12 after which, the contents of the pot may be poured from the spout through the basket 15 with the weight within the basket insuring the basket remaining in position to receive the liquid poured from the pot.

From the foregoing description, taken in connection with the accompanying drawing, it is at once apparent that an attachment for tea and coffee pots has been provided which is highly efficient for the purpose set forth.

Having thus described the invention, what is claimed as new, is:

1. A device of the class described comprising a plate, an open topped receptacle on said plate having a pocket at one end thereof, a yoke extending above the top of said receptacle, a weighted strainer swingingly mounted on said yoke, and spout engaging members on said plate.

2. A device of the class described comprising a plate, an open topped receptacle carried thereby, a pocket at one end of said receptacle extending beyond said plate, an inclined yoke at the other end of the receptacle, a reticulated and weighted basket above the open top of said receptacle mounted to swing on said yoke, hooks on said plate, and a clamp on said plate below the said hooks.

In testimony whereof I affix my signature.

FREDERICK T. CONLEY.

Copies of this patent may be obtained for five cents each, by addressing the "Commissioner of Patents, Washington, D. C."